(12) United States Patent
Ralston

(10) Patent No.: US 8,957,539 B1
(45) Date of Patent: Feb. 17, 2015

(54) HYBRID TURBOGENERATOR AND ASSOCIATED METHOD

(71) Applicant: The Boeing Company, Chicago, IL (US)

(72) Inventor: Mark Dixon Ralston, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 13/652,980

(22) Filed: Oct. 16, 2012

(51) Int. Cl.
*H02K 7/18* (2006.01)

(52) U.S. Cl.
USPC .............................. 290/52; 60/772

(58) Field of Classification Search
CPC ............... F01D 15/10; F02C 9/28; F02C 7/08
USPC ............................... 290/52; 60/772
See application file for complete search history.

(56) References Cited

U.S. PATENT DOCUMENTS

| | | | |
|---|---|---|---|
| 4,754,607 A | 7/1988 | Mackay | |
| 4,821,506 A | 4/1989 | Rodgers | |
| 5,497,615 A | 3/1996 | Noe et al. | |
| 5,799,484 A | 9/1998 | Nims | |
| 5,845,479 A * | 12/1998 | Nakhamkin et al. | 60/777 |
| 6,031,294 A | 2/2000 | Geis et al. | |
| 6,105,697 A | 8/2000 | Weaver | |
| 6,169,332 B1 | 1/2001 | Taylor et al. | |
| 6,526,757 B2 | 3/2003 | Mackay | |
| 6,606,864 B2 * | 8/2003 | MacKay | 60/773 |
| 8,631,657 B2 * | 1/2014 | Hagen et al. | 60/775 |
| 2009/0179424 A1 * | 7/2009 | Yaron | 290/52 |
| 2012/0000204 A1 * | 1/2012 | Kesseli et al. | 60/778 |
| 2013/0139515 A1 * | 6/2013 | Schlak | 60/772 |

OTHER PUBLICATIONS

"Multi-Pressure Gas Turbines"; [online] [retrieved Aug. 12, 2014]. Retrieved from the Internet: URL: http://agileturbine.com/publications/index.html. 10 pages.

* cited by examiner

*Primary Examiner* — Michael Zarroli
(74) *Attorney, Agent, or Firm* — Alston & Bird LLP

(57) ABSTRACT

A hybrid turbogenerator and a method of operation are provided to configure a gas turbine engine. In the context of a method, a hybrid turbogenerator including a gas turbine engine coupled to an electric motor-generator alternates between a standby mode and a charging mode. In the standby mode, the method at least partially closes one or more inlet guide vane(s) to limit air flow through a compressor and into a turbine. In the standby mode, the method provides power to both a power bus and the electric motor-generator from an energy storage device. In the charging mode, the method at least partially opens the inlet guide vane(s) to increase air flow through the compressor and into the turbine relative to the standby mode. In the charging mode, the method provides electric power from the electric motor-generator to both the power bus and the energy storage device.

20 Claims, 14 Drawing Sheets

HYBRID TURBOGENERATOR AND ASSOCIATED METHOD

TECHNOLOGICAL FIELD

An example embodiment of the present disclosure relates generally to a hybrid turbogenerator and an associated method of operation.

BACKGROUND

Auxiliary power units (APUs) are utilized in a variety of applications in order to, for example, provide electrical power in instances in which the primary power supply is unavailable. For example, gas turbine APUs are installed onboard commercial transport airplanes to provide power to airplane systems during ground conditions in instances in which the main engines are not operating and in which external ground power supplies are not available.

Conventional gas turbine APUs are typically less fuel efficient than diesel engine powered external power carts or airline terminal supplied external power sources. In order to reduce the amount of fuel consumed on the ground, some airlines have tried to curtail use of onboard APUs. However, fuel burned by the APUs still remains a significant airline expense.

Hybrid electric power architecture has been applied to reciprocating piston engine powered road vehicles for the purpose of reducing fuel consumption. A series hybrid electric vehicle propulsion system typically consists of a reciprocating piston engine driving a generator, an electrical storage battery and an electric motor-generator coupled to the road wheels. By managing the distribution of electrical power flowing between the engine driven generator, traction motor and battery, the piston engine may be started and operated only when required. Intermittent operation of the engine allows the vehicle engine, during operation, to run at or near its most efficient speed and power loading, thereby reducing fuel consumption over the vehicle's operating cycle as compared to a conventionally powered vehicle with a continuously operating engine running at partial power load.

The piston engine on a series hybrid road vehicle shuts down while the vehicle operates on the battery, and then periodically restarts to replenish battery charge. However, such frequent starting and stopping of the gas turbine power section of an aircraft gas turbine APU is not likely to be practical due to constraints that are characteristic of gas turbine APU design. First, gas turbine APUs utilize a heavy main rotor that requires more time to spool up from a dead stop to operating speed as compared to a piston engine. Second, imposing repeated firing and cooling cycles on an APU turbine hot section may have a deleterious effect on the life the turbine hot section components. Reducing the frequency of starting and stopping cycles sufficiently to address turbine hot section thermal fatigue life issues may necessitate use of a battery or other energy storage device of such a large capacity that its weight is likely to be too great to be practical for aircraft use.

Simply loading and unloading a gas turbine APU while it runs at governed speed imposes lower thermal fatigue stress on the turbine section, but this would not reduce fuel consumption because specific fuel consumption of a continuously operating gas turbine engine increases substantially at partial load. Reducing APU rotor speed for the purpose of reducing total air flow through an idling APU has little benefit for reducing no-load fuel consumption because reducing speed also substantially reduces cycle pressure ratio, which reduces Brayton cycle efficiency, and consequently increases specific fuel consumption.

BRIEF SUMMARY

A hybrid turbogenerator and an associated method of operation are provided according to an example embodiment of the present disclosure in order to configure a gas turbine engine for operation with increased fuel efficiency, such as for use as an APU or otherwise. In this regard a hybrid turbogenerator and an associated method of operation are provided in order to controllably operate the gas turbine engine alternately in a standby mode and a charging mode so as to provide improved fuel efficiency while retaining the weight advantage of a gas turbine engine relative to a comparable diesel engine. As such, an APU may incorporate the hybrid turbogenerator of one embodiment in order to provide operational and performance benefits to the platform, such as the airplane, that carries the APU.

In one embodiment, a method of operating a hybrid turbogenerator including a gas turbine engine coupled to an electric motor-generator is provided that includes alternating between a standby mode and a charging mode. During operation in the standby mode, the method includes at least partially closing one or more inlet guide vanes to limit air flow through a compressor and to a turbine of the gas turbine engine. During operation in this standby mode, the method also includes providing electric power to both a power bus and the electric motor-generator from an energy storage device. During operation in the charging mode, the method also includes at least partially opening the one or more inlet guide vanes to increase air flow through the compressor and to a turbine of the gas turbine engine relative to the standby mode. During operation in the charging mode, the method also provides electric power from the electric motor-generator to both the power bus and the energy storage device. In one embodiment, the method also includes recovering heat from an exhaust gas flow from the gas turbine engine and transferring the heat to a discharge flow from the compressor.

Further, to alternate between the standby mode and the charging mode, the method of one embodiment may monitor a charge stored by the energy storage device and control operation in the standby mode and the charging mode based upon the charge stored by the energy storage device. In regards to the at least partial closure of the one or more inlet guide vanes during the standby mode, the method may close the one or more inlet guide vanes so as to limit air flow therethrough to less than a predefined percentage of the air flow through the one or more inlet guide vanes during the charging mode. The method of one embodiment may also include providing an intermittent supply of bleed air from a compressor with more bleed air supplied during the charging mode than during the standby mode.

In another embodiment, a hybrid turbogenerator is provided that includes a gas turbine engine including a compressor, a combustor and a turbine. The hybrid turbogenerator also includes an electric motor-generator rotationally coupled to the gas turbine engine and an energy storage device, such as a capacitor bank. The hybrid turbogenerator also includes one or more inlet guide vanes positioned to at least partially control air flow through the compressor and to the turbine of the gas turbine engine. Further, the hybrid turbogenerator includes a controller configured to cause operation of the hybrid turbogenerator to alternate between the standby mode and the charging mode. During operation in the standby mode, the controller is configured to at least partially close one or more inlet guide vanes to limit air flow through the compressor and to the turbine of the gas turbine engine and to provide electric power to both a power bus and the electric motor-generator from the energy storage device. During the operation in the charging mode, the controller is configured to at least partially open the one or more inlet guide vanes to increase air flow through the compressor and to the turbine of the gas turbine engine relative to the standby mode and to provide electric power from the electric motor-generator to both the power bus and the energy storage device. In one embodiment, the hybrid turbogenerator also includes a recuperator configured to recover heat from an exhaust gas flow from the gas turbine engine and to transfer the heat to a discharge flow from the compressor.

The controller of one embodiment is further configured to monitor a charge stored by the energy storage device and to control operation in the standby mode and the charging mode based upon the charge stored by the energy storage device. The controller of one embodiment is also configured to at least partially close the one or more inlet guide vanes during the standby mode so as to limit air flow therethrough to less than a predefined percentage of the air flow through the one or more inlet guide vanes during the charging mode.

In the further embodiment, a method of operating a hybrid turbogenerator including a gas turbine engine coupled to an electric motor-generator is provided that includes alternating between the standby mode and a charging mode. During operation in the standby mode, the method includes controllably positioning a plurality of valves so as to direct air flow through the gas turbine engine to a turbine and then to a compressor. During operation in the standby mode, the method also includes providing electric power to a power bus from an energy storage device. During operation in the charging mode, the method includes controllably positioning the plurality of valves so as to redirect air flow through the gas turbine engine to the compressor and then to the turbine. During operation in the charging mode, the method also includes providing electric power from the electric motor-generator to both the power bus and the energy storage device.

During operation in the standby mode, the method may also include intercooling gas flowing between the turbine and the compressor. During operation in the charging mode, the method may also include recovering heat from an exhaust gas flow from the gas turbine engine and transferring the heat to a discharge flow from the compressor. The method of one embodiment controllably positions the plurality of valves during operation in the standby mode by controllably positioning the plurality of valves so as to direct air flow through a recuperator for preheating to a burner for combustion to the turbine for expansion and then to the compressor for compression prior to being exhausted. In one embodiment, the method alternates between the standby mode and the charging mode by monitoring a charge stored by the energy storage device and controlling operation in the standby mode and the charging mode based upon the charge stored by the energy storage device.

In yet another embodiment, a hybrid turbogenerator is provided that includes the gas turbine engine including a compressor and a turbine, an electric motor-generator rotatably coupled to the gas turbine engine, and an energy storage device. The hybrid turbogenerator also includes a plurality of valves configured to direct air flow through the gas turbine engine. Further, the hybrid turbogenerator includes a controller configured to cause operation of the hybrid turbogenerator to alternate between the standby mode and the charging mode. During operation in the standby mode, the controller is configured to controllably position the plurality of valves so as to direct air flow through the gas turbine engine to the turbine and then to the compressor and to provide electric power to a power bus from the energy storage device. During operation in the charging mode, the controller is configured to controllably position the plurality of valves so as to redirect air flow through the gas turbine engine to the compressor and then to the turbine and to provide electric power from the electric motor-generator to both the power bus and the energy storage device.

The hybrid turbogenerator of one embodiment also includes an intercooler configured, during operation in the standby mode, to cool gas flowing between the turbine and the compressor. The hybrid turbogenerator of one embodiment also includes the recuperator configured during operation in the charging mode to recover heat from an exhaust gas flow from the gas turbine engine and to transfer the heat to a discharge flow from the compressor. In one embodiment, the controller, during operation in the standby mode, is further configured to controllably position the plurality of valves so as to direct air flow through a recuperator for preheating to a burner for combustion to the turbine for expansion and then to the compressor for compression prior to being exhausted. The controller of one embodiment may be further configured to monitor a charge stored by the energy storage device and to control operation in the standby mode and the charging mode based upon the charge stored by the energy storage device.

BRIEF DESCRIPTION OF THE SEVERAL VIEWS OF THE DRAWINGS

Figure 1:
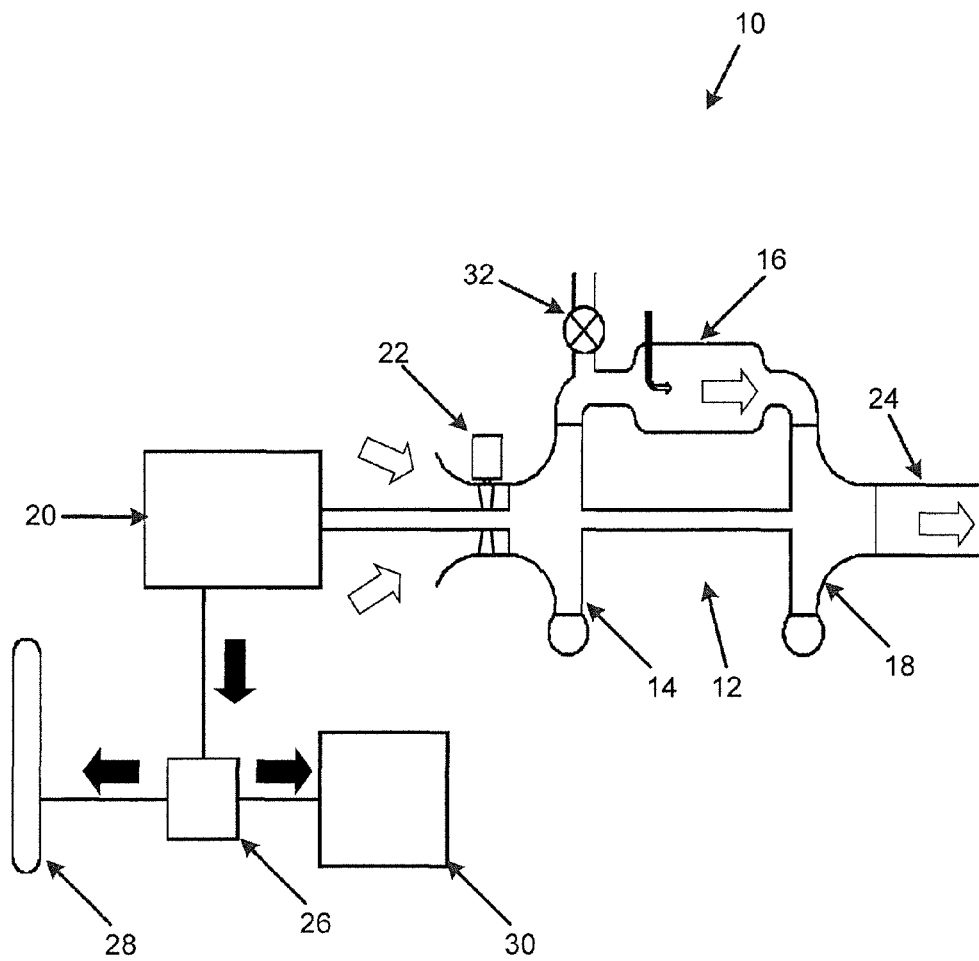
Figure 2:
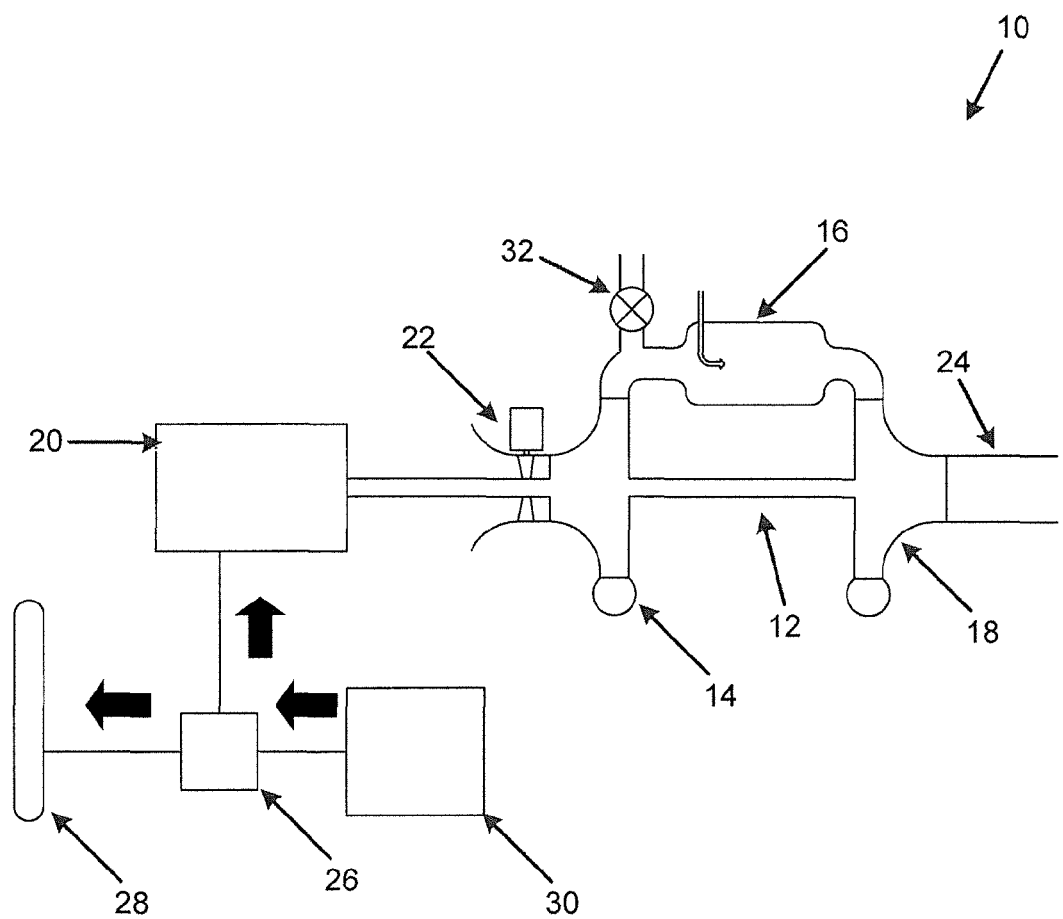
Figure 3:
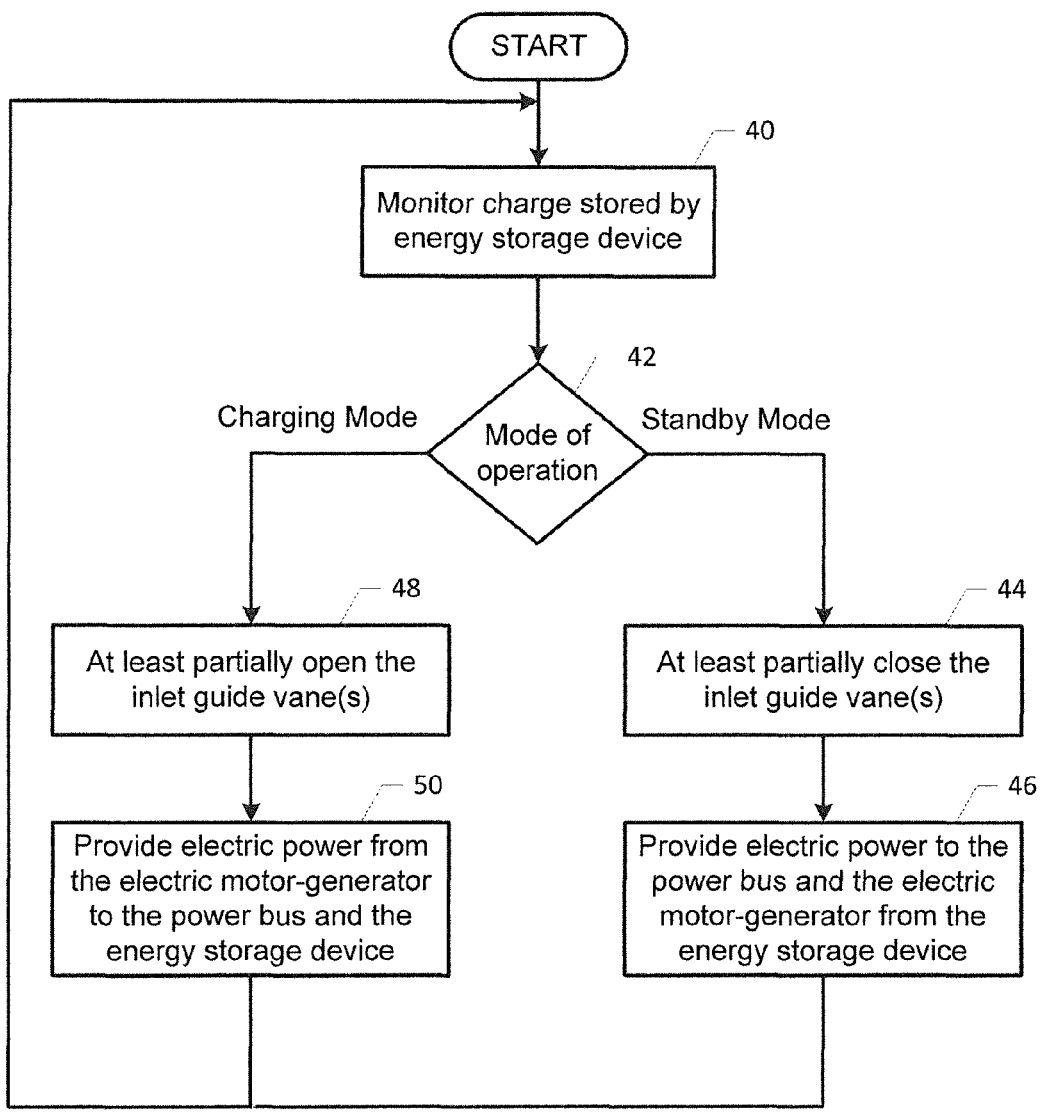
Figure 4:
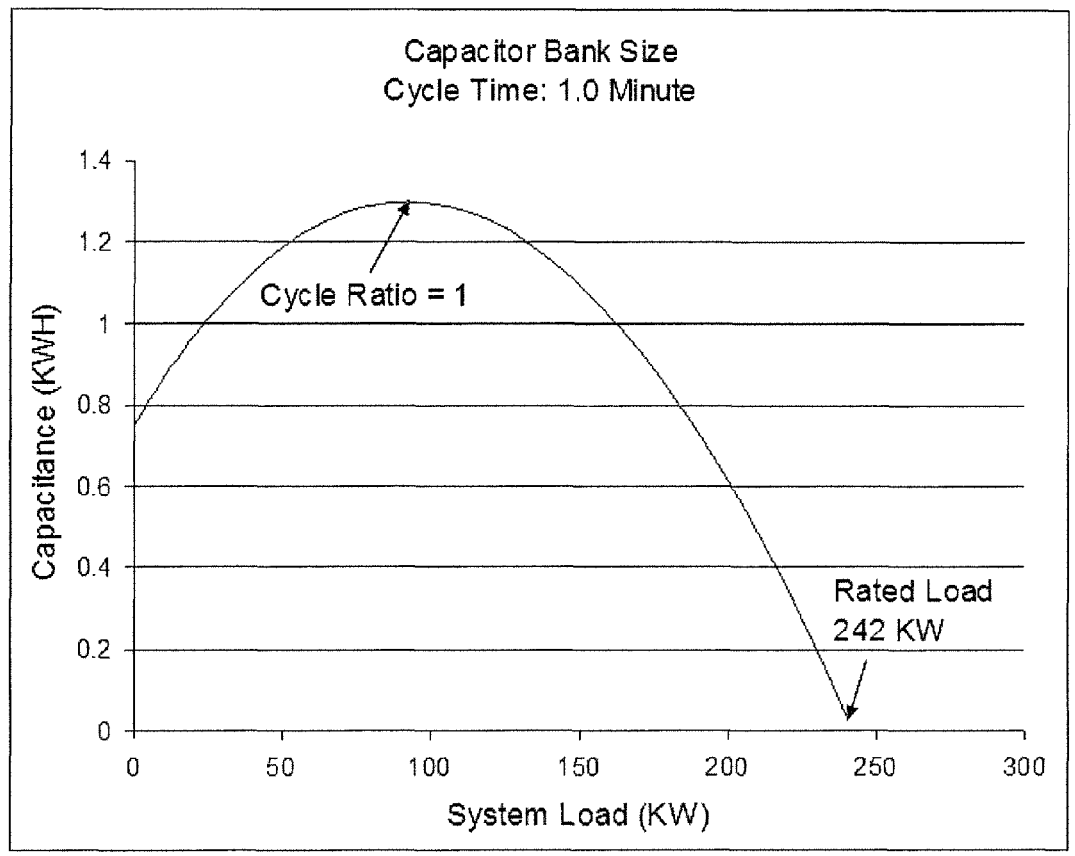
Figure 5:
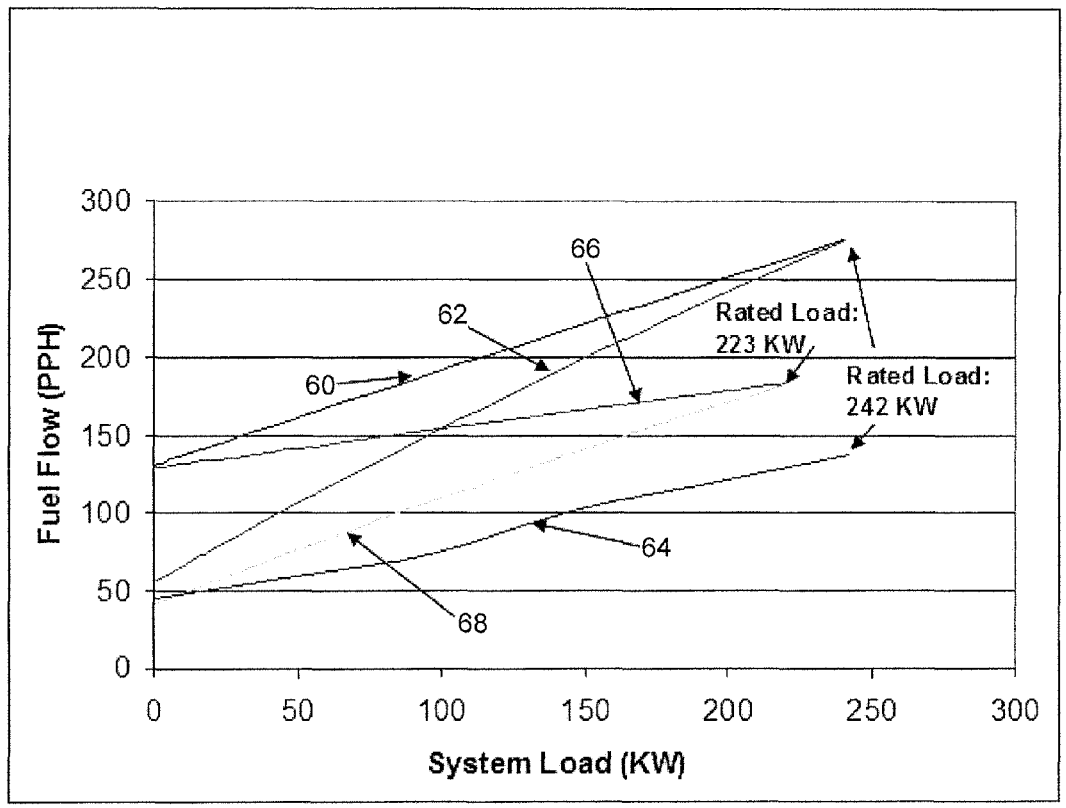
Figure 6:
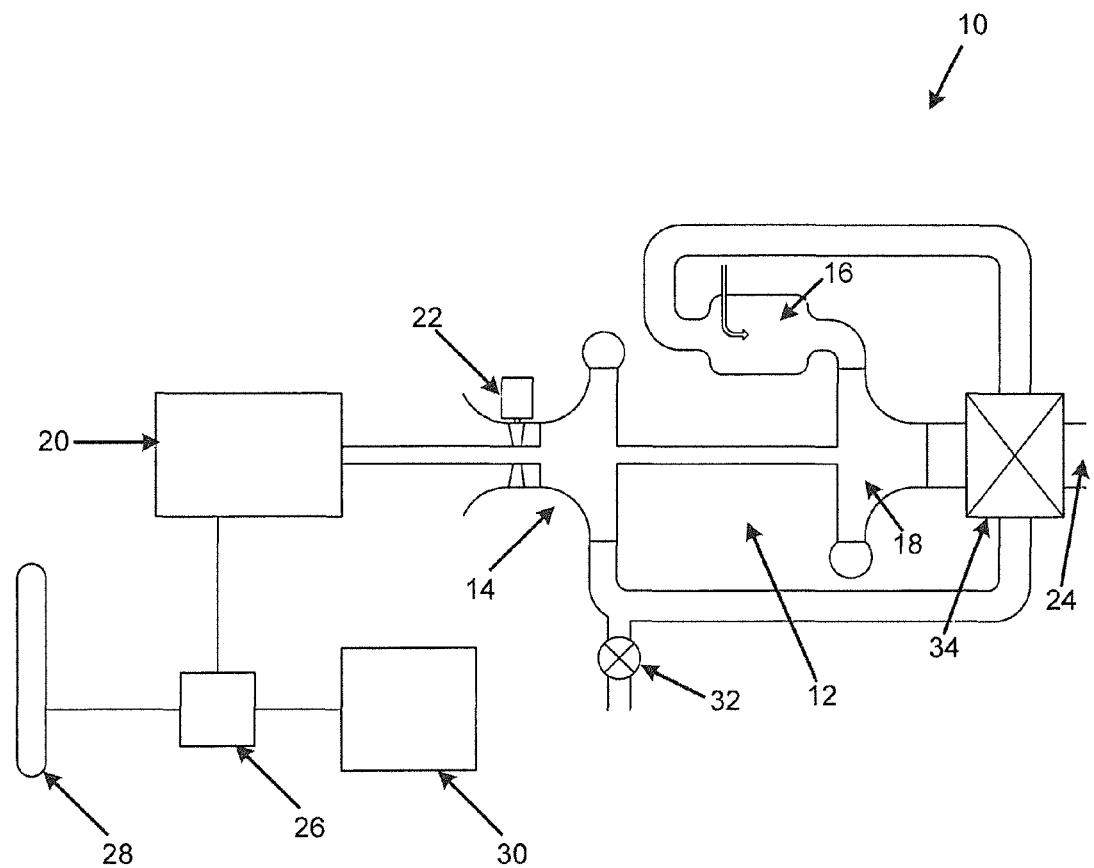
Figure 7:
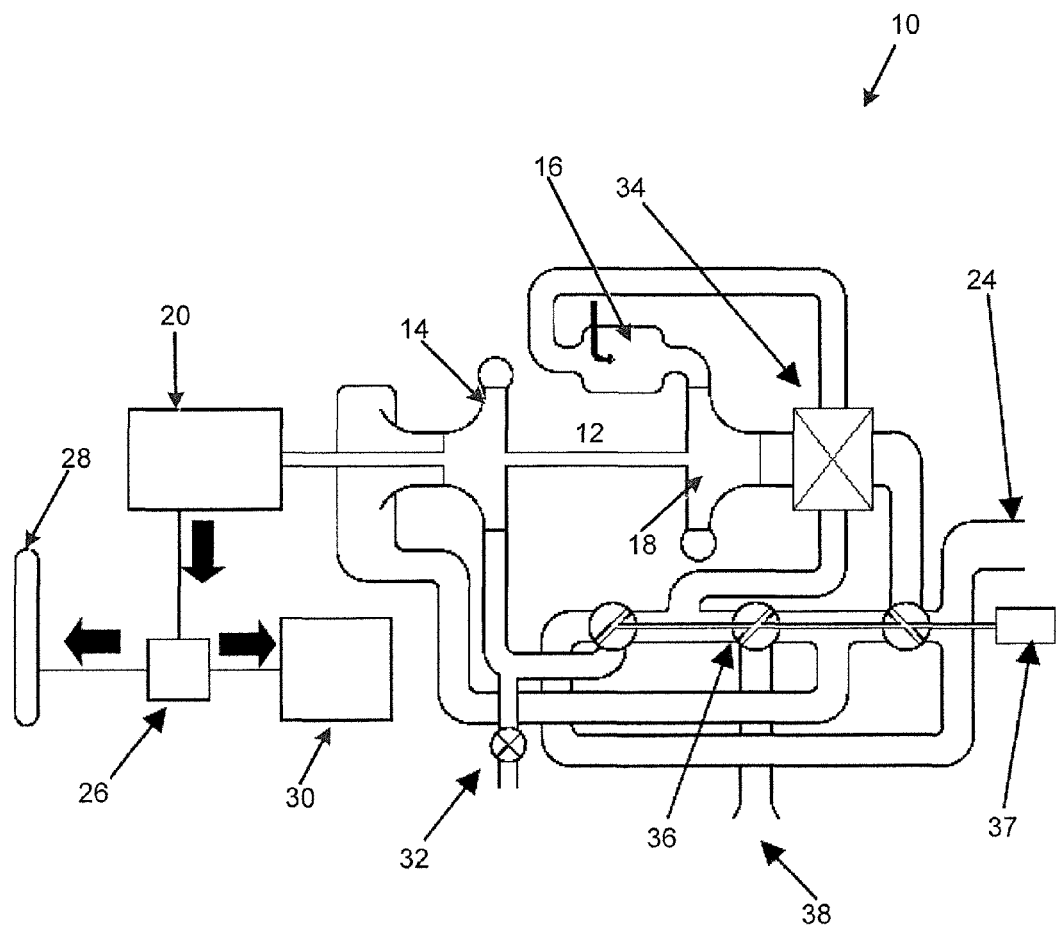
Figure 8:
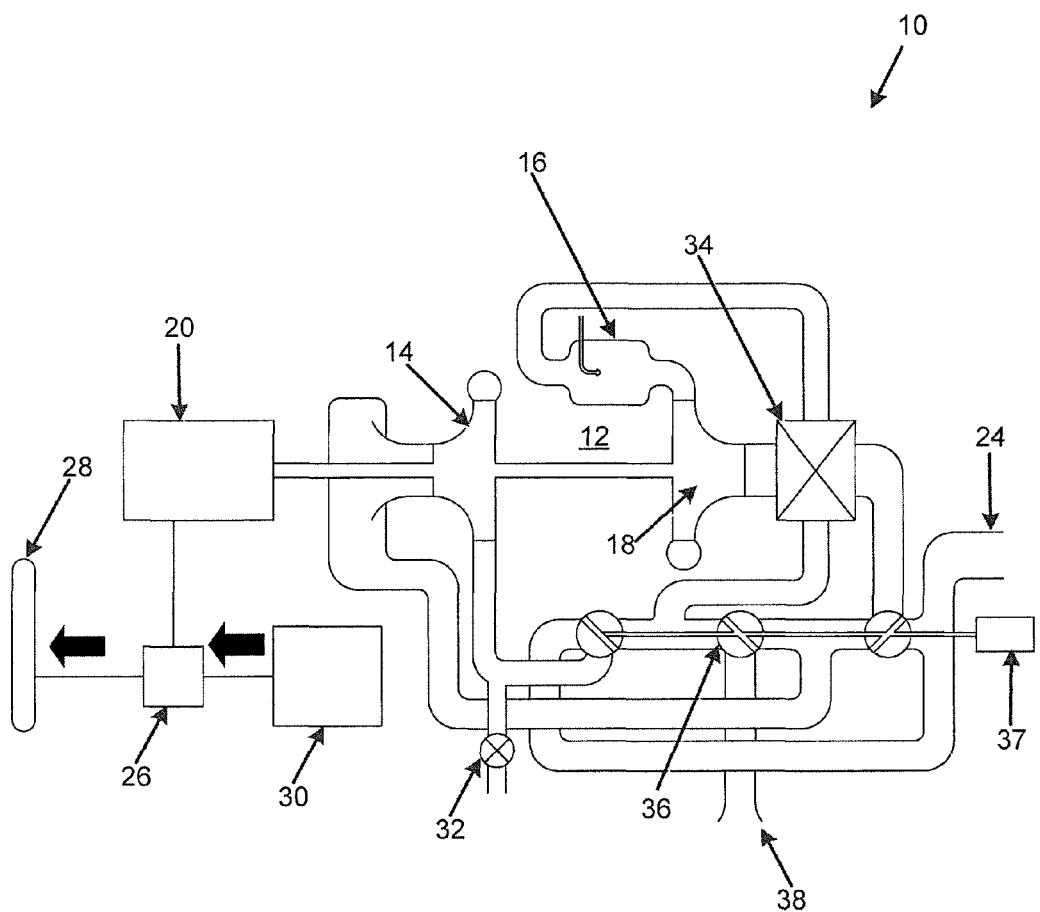
Figure 9:
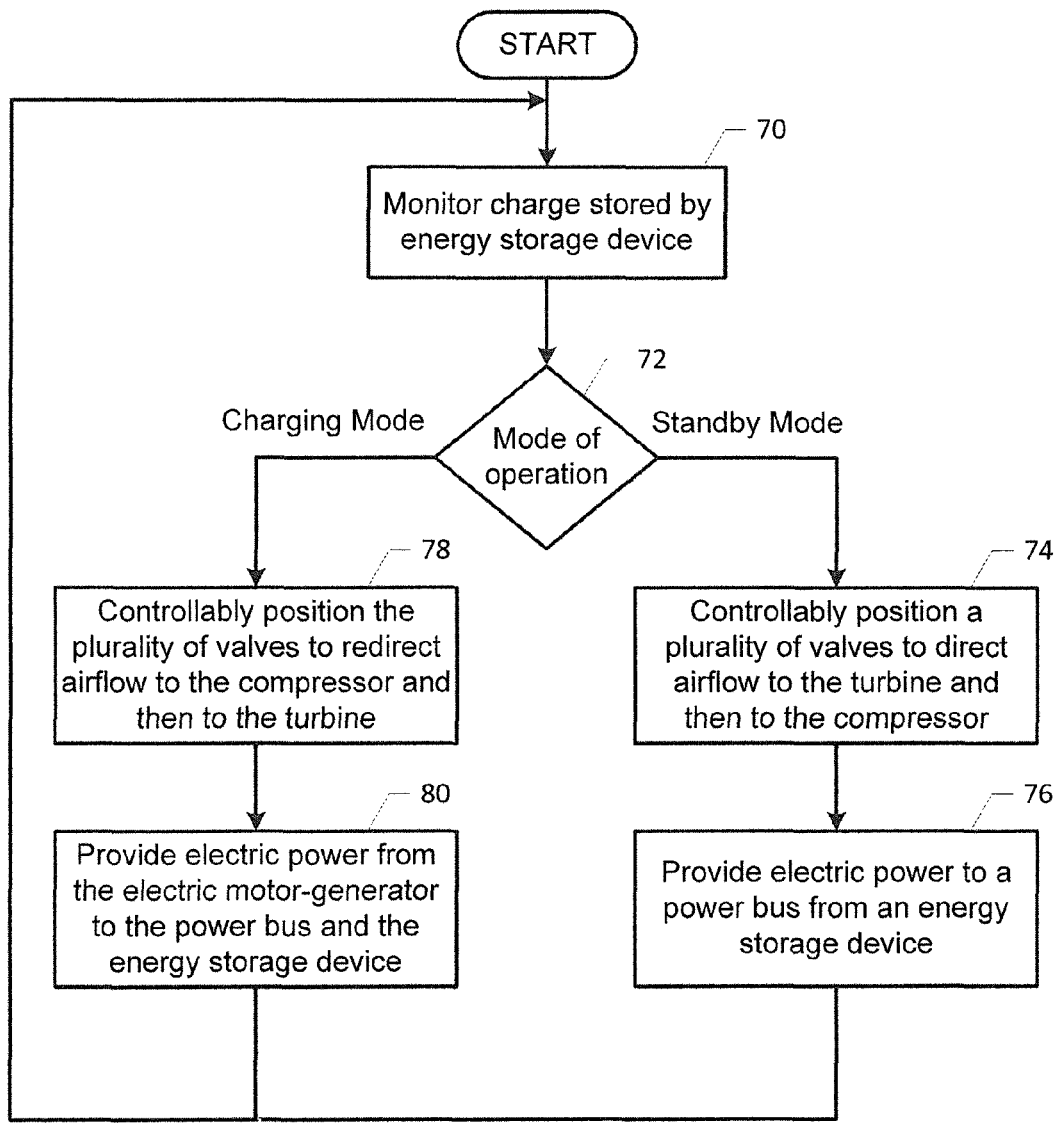
Figure 10:
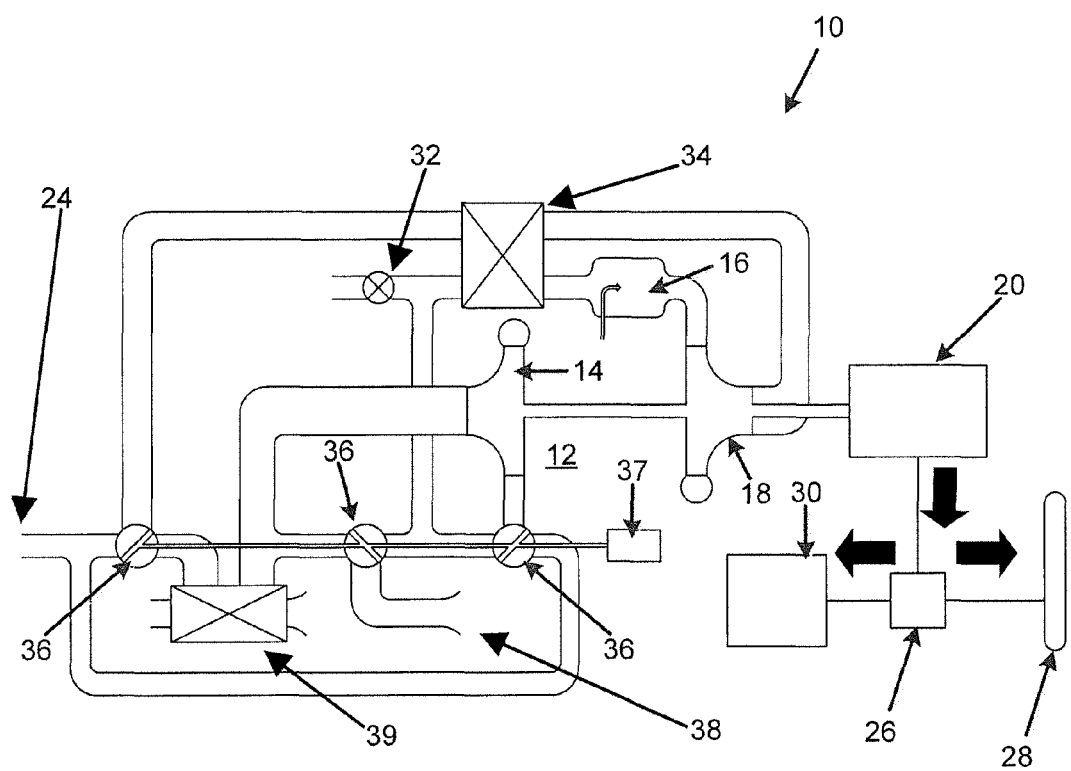
Figure 11:
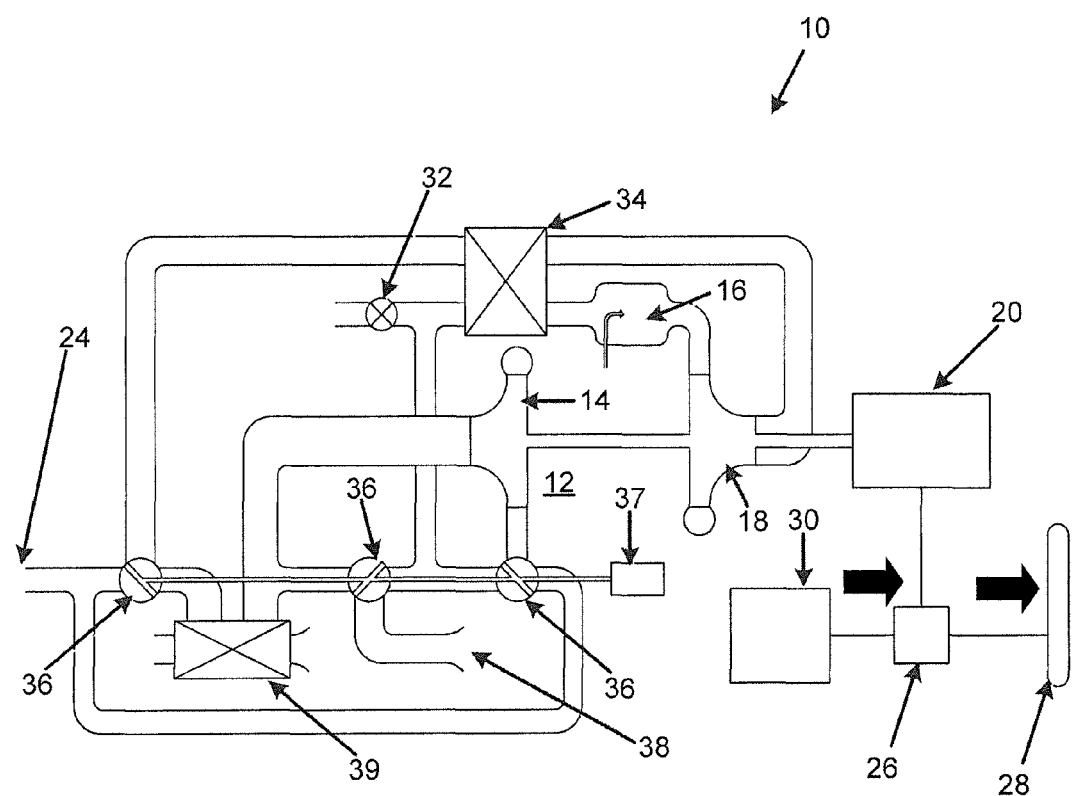
Figure 12:
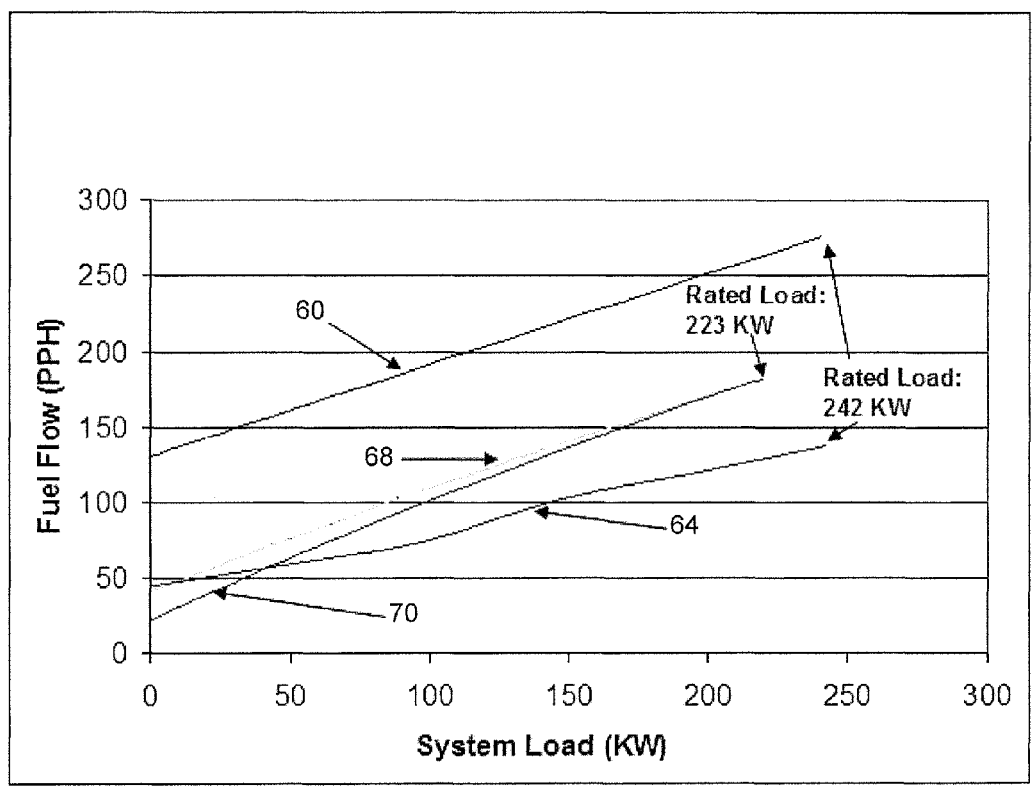
Figure 13:
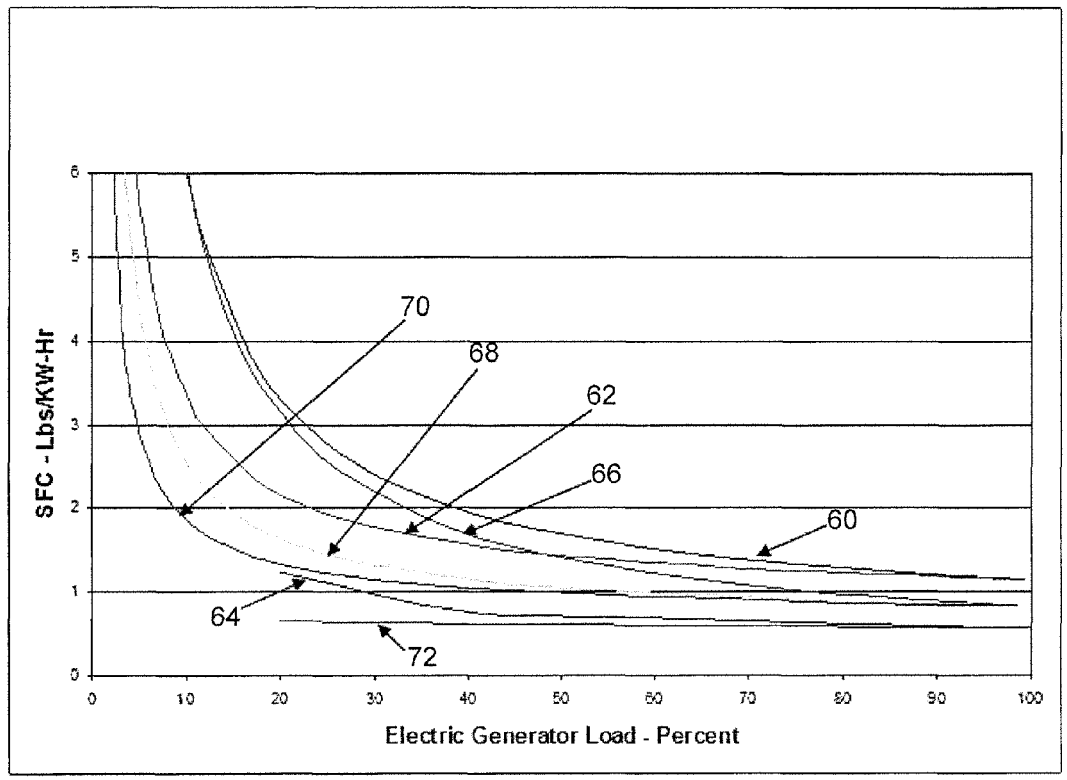
Figure 14:
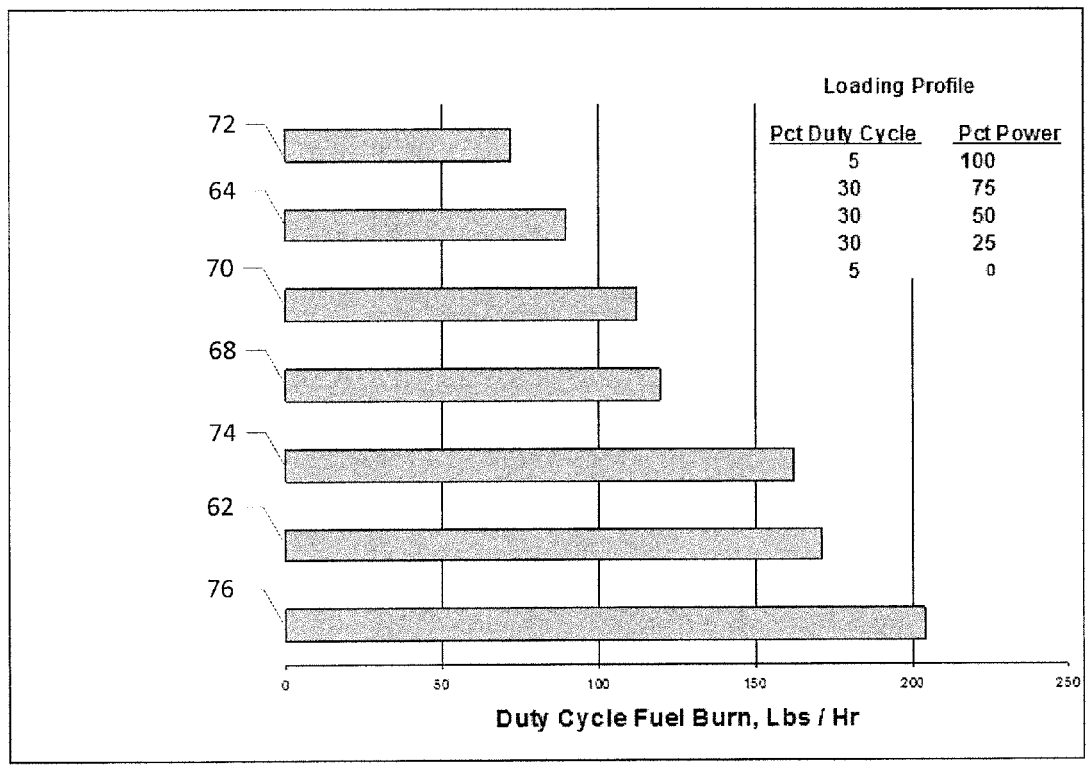

Having thus described certain embodiments of the present disclosure in general terms, reference will now be made to the accompanying drawings, which are not necessarily drawn to scale, and wherein:

FIG. 1 is a schematic representation of a hybrid turbogenerator operating in a charging mode in accordance with one embodiment of the present disclosure;

FIG. 2 is a schematic representation of a hybrid turbogenerator operating in a standby mode in accordance with one embodiment of the present disclosure;

FIG. 3 is flow chart illustrating operations performed in accordance with the operation of a hybrid turbogenerator of one embodiment of the present disclosure;

FIG. 4 is a graphical representation of the capacitor bank size for a cycle time of one minute as a function of system load;

FIG. 5 is a graphical representation of the fuel flow as a function of system load for a plurality of different electric APUs;

FIG. 6 is a schematic representation of a hybrid turbogenerator including a recuperator in accordance with one embodiment of the present disclosure;

FIG. 7 is a schematic representation of a hybrid turbogenerator operating in a charging mode in accordance with another embodiment of the present disclosure;

FIG. 8 is a schematic representation of a hybrid turbogenerator operating in a standby mode in accordance with another embodiment of the present disclosure;

FIG. 9 is flow chart illustrating operations performed in accordance with the operation of a hybrid turbogenerator of another embodiment of the present disclosure;

FIG. 10 is a schematic representation of a hybrid turbogenerator including an intercooler that is operating in a charging mode in accordance with a further embodiment of the present disclosure;

FIG. 11 is a schematic representation of a hybrid turbogenerator including an intercooler that is operating in a standby mode in accordance with a further embodiment of the present disclosure;

FIG. 12 is a graphical representation of the fuel flow as a function of system load for a plurality of different electric APUs;

FIG. 13 is a graphical representation of the specific fuel consumption of a plurality of different electric APUs; and FIG. 14 is a graphical representation of the duty cycle fuel burn of a plurality of different electric APUs.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a hybrid turbogenerator 10 that may be embodied by a hybrid gas turbine APU is illustrated. The hybrid turbogenerator 10 may be carried by an aircraft for use as an APU. Alternatively, the hybrid turbogenerator may be utilized in other applications including non-aviation applications that may benefit from fuel savings and/or decreased weight, such as ground vehicle propulsion, e.g., trucks, buses, rail locomotives, military vehicles and automobiles, marine propulsion including commercial boats and small stationary electric power applications.

The hybrid turbogenerator 10 includes a gas turbine engine 12 that includes a compressor 14, a combustor 16 and a turbine 18. The hybrid turbogenerator 10 of this embodiment also includes one or more inlet guide vanes 22 to control air flow through the gas turbine engine 12. In operation, the air received by the compressor 14 may be compressed and then discharged to the combustor 16. Within the combustor 16, fuel may be mixed with the compressed air and then combusted with the combustion product provided to the turbine 18 for expansion and subsequent discharge through the exhaust 24. Although the gas turbine engine 12 may be configured in various manners, the gas turbine engine of one embodiment is a single spool rotor with a single stage axial-centrifugal compressor 14 and radial inflow turbine 18. The hybrid turbogenerator 10 also includes a motor-generator 20, such as a brushless electric alternating current (AC) motor-generator. The motor-generator 20 may be rotationally connected to the gas turbine engine 12 and, in one embodiment, the rotor of the gas turbine engine may drive the motor-generator, either directly or through a speed reducing gearbox.

The hybrid turbogenerator 10 may also include a controller 26, such as an electronic power controller, that is in communication with the motor-generator 20. Further, the hybrid turbogenerator 10 may include an energy storage device 30. The energy storage device 30 of one embodiment may include a bank of capacitors, such as a bank of lithium ion capacitors, electric dual layer capacitors or other ultra-capacitors. The controller 26 may distribute power generated by the gas turbine engine 12 and the motor-generator 20 to the energy storage device 30 and a power bus 28 which, in turn, may distribute the power to one or more electrical loads.

As noted above, the hybrid turbogenerator 10 also includes one or more inlet guide vanes 22 associated with the compressor 14 so as to control the air flow through the compressor. For example, the inlet guide vanes 22 may be positioned upstream of the compressor 14 relative to the direction in which the air is flowing into the compressor. The inlet guide vanes 22 may be configured to be controllably opened so as to permit the air to flow freely to the compressor 14 or closed, either fully or partially, so as to block or at least limit the air flow to the compressor. The inlet guide vanes 22 may be positioned by an actuator which may, in turn, operate based upon commands issued by the controller 26.

The hybrid turbogenerator 10 may be configured to alternatively operate in a standby mode and a charging mode. In the charging mode, the controller 26 may be configured to position the inlet guide vanes 22 in a fully or substantially open position such that the gas turbine engine 12 runs at rated power and drives the motor-generator 20 in generator mode at governed speed. In this embodiment, the controller 26 may distribute the power provided by the motor-generator 20, such as three-phase 115 VAC power, to the power bus 28 so as to be distributed to one or more loads. The remainder of the electrical power provided by the motor-generator 20 may be provided by the controller 26 to the energy storage device 30 so as to charge the energy storage device. While the energy storage device 30 is being charged, the controller 26 may monitor the charge stored by the energy storage device and, upon detecting that the energy storage device has stored a charge that satisfies a predefined criteria, such as by being fully charged, the controller may cause the hybrid turbogenerator 10 to switch to operation in the standby mode.

In the standby mode, as shown in FIG. 2, the controller 26 may be configured to cause the inlet guide vanes 22 to close, thereby restricting the air flow to the compressor 14. While the controller 14 may direct the inlet guide vanes 22 to close to varying degrees, the controller of one embodiment directs the inlet guide vanes to close so as to limit air flow therethrough to less than a predefined percentage of the air flow through the inlet guide vanes during the charging mode. In one embodiment, for example, the controller 26 may direct the inlet guide vanes 22 to close so as to limit the air flow therethrough to less than 10% of the air flow through the inlet guide vanes during the charging mode, such as to 6% of the air flow through the inlet guide vanes during the charging mode. By substantially, but not completely closing the inlet guide valves 22, power absorbed by the compressor 14 is reduced, such as to a minimum practical value, while maintaining sufficient air flow to the combustion chamber 16 to maintain the combustion flame. At such a low air flow rate and a correspondingly low pressure across the compressor 14, the turbine 18 may provide insufficient shaft power to drive the gas turbine engine 12 at governed speed. Thus, in the standby mode, the hybrid turbogenerator 10 may change from a speed governing modulation mode as in the charging mode to an exhaust gas temperature modulating mode as in the standby mode so as to maintain the component temperatures within the hot section of the hybrid turbogenerator stable.

In the standby mode, the controller 26 may be configured to provide power from the energy storage device 30 to the motor-generator 20 as is required to motor the gas turbine engine 10 at normal governed speed while simultaneously distributing electric power to the power bus 28 to service the electrical loads. During the standby mode, the controller 26 may again monitor the charge maintained by the energy storage device 30 and may direct that the operation of the hybrid turbogenerator 10 shifts from the standby mode to the charging mode in an instance in which the charge maintained by the energy storage device falls below a predefined threshold, such as by being fully depleted.

The controller 26 may control the electrical power phase, voltage and frequency delivered to the power bus 28 so as to maintain a smooth flow of power without power breaks, voltage spikes or AC frequency changes as the hybrid turbogenerator 10 transitions between the charging mode and the standby mode. As discussed below, the duration of the operating cycle is generally a function of the capacity of the energy storage device 30 such that increases in the duration of the operating cycle generally cause the size and weight of the energy storage device to correspondingly increase.

As shown in FIGS. 1 and 2, the hybrid turbogenerator 10 may also include a valve 32 for controlling bleed air, that is, compressed air that is bled from the compressor 14, upstream of the combustor 16, for use by other systems, such as an environmental control system. As a result of the change, such as the substantial change, of the air flow through the compressor 14 in the standby mode and the charging mode, an intermittent supply of bleed air may be supplied by the compressor with more bleed air supplied during the charging mode than during the standby mode. As such, the systems that receive the bleed air may be configured to operate with an intermittent supply of compressed air. For example, in an instance in which bleed air is supplied to an environmental control system, the intermittent supply of bleed air may be appropriate in instances in which the cabin temperature is stable and the cabin cooling or heating demands are moderate. In other embodiments, the environmental control system may include cabin air ventilation fans to circulate cabin air and/or replenish cabin air with fresh air in instances in which an insufficient amount of bleed air is supplied.

Referring now to FIG. 3, the method of operating a hybrid turbogenerator 10 of one embodiment is depicted. As shown, the charge stored by the energy storage device 30 may be monitored, such as by the controller 26, and, based upon the charge stored by the energy storage device, a mode of operation may be determined. See blocks 40 and 42. For example, in an instance in which the energy storage device 30 stores a charge that satisfies a predefined threshold, such as by being fully charged, the hybrid turbogenerator 10 may be operated in a standby mode. Conversely, in an instance in which the energy storage device 30 has less than a predefined charge, such as by being fully depleted, the hybrid turbogenerator 10 may be placed in a charging mode of operation. In the standby mode of operation, the hybrid turbogenerator 10 may be operated so as to at least partially close the inlet guide vanes 22, thereby limiting air flow to the compressor 14 and, more generally, to the gas turbine engine 12. See block 44. In the standby mode, electric power is provided by the controller 26 to the power bus 28 and to the electric motor-generator 20 from the energy storage device 30. See block 46. However, in the charging mode, the hybrid turbogenerator 10 may be operated so as to at least partially open the inlet guide vanes, thereby providing increased air flow to the compressor 14 and, more generally, to the gas turbine engine 12. See block 48. In the charging mode, electric power is provided from the electric motor-generator 20 to the power bus 28 and the energy storage device 30, thereby recharging the energy storage device. See block 50.

To determine the mean fuel consumption rate of one embodiment of a hybrid turbogenerator 10 over a complete cycle of an energy storage device 30 being charged and discharged, the operating cycle can be defined as follows:

$$T = T_d + T_c \tag{1}$$

and:

$$K = T_c/T_d \tag{2}$$

wherein T is the elapsed time of one charging and discharging cycle, $T_d$ is the elapsed time of the discharging cycle, $T_c$ is the elapsed time of the charging cycle and K is the cycle ratio of charging time divided by discharging time.

Combining equations (1) and (2) above gives the charging and discharging elapsed time values:

$$T_d = T/(1+K) \tag{3}$$

and:

$$T_c = KT/(1+K) \tag{4}$$

During the charging cycle, the charging rate of the energy storage device 30 in kilowatts can be given as:

$$I_c = (I_g - I_s)\eta_{cap} \tag{5}$$

wherein $I_g$ is the generator output in kilowatts, $I_s$ is the system load, and $\eta_{cap}$ is the combined conversion efficiency of the energy storage device 30 and controller 26.

During the discharging cycle, the discharging rate of the energy storage device 30 in kilowatts can be given as:

$$I_d = (I_m + I_s)/\eta_{cap} \tag{6}$$

wherein $I_m$ is the APU standby motoring power consumed in kilowatts.

Given the size of the energy storage device C in kilowatt hours:

$$C = I_c T_c \eta_{cap} \tag{7}$$

and:

$$C = (I_d T_d)\eta_{cap} \tag{8}$$

Combining the above and eliminating C gives:

$$I_d/I_c \eta_{cap}^2 = T_c/T_d = K \tag{9}$$

System operating characteristics may be calculated as follows:
Charging power, $I_c$, from equation (5)
Discharging power, $I_d$, from equation (6)
Cycle time ratio, K, from equation (9)
Charging elapsed time, $T_c$, from equation (7)
Discharging elapsed time, $T_d$, from equation (8)
Total cycle time, T, from equation (1)
The mean rate of fuel consumption in the hybrid operating mode can then be defined as:

$$W_f = (W_{fc} T_c + W_{fd} T_d)/T \tag{10}$$

wherein $W_{fc}$ is the gas turbine engine fuel consumption rate while the energy storage device 30 is charging and the gas turbine engine 12 is running at rated power, and $W_{fd}$ is the gas turbine engine fuel consumption rate while the energy storage device is discharging and the gas turbine engine is motoring in standby mode. The parameter $W_{fc}$ may be available from the performance data at rated load provided by the manufacturer of the gas turbine engine 12. To determine the parameter $W_{fd}$, the performance of the compressor 14 with inlet guide vanes 22 is considered, such as based upon an extrapolation and scaling of sea level load compressor performance data.

Air flow and horsepower values from the extrapolated performance characteristics may be scaled up, if necessary, to give air flow and horsepower values representative of a hybrid APU power section compressor 14 motoring in standby mode. To obtain total standby motoring electrical power absorbed, $I_m$, APU accessory drive horsepower is added to the compressor horsepower.

Fuel flow required to elevate compressor discharge temperature to a turbine inlet temperature sufficient to maintain normal turbine operating temperature can be determined by:

$$W_{fd} = W_a C_p (T_3 - T_2)/\text{LHV}_f \quad (11)$$

wherein:
$W_a$=Airflow with inlet guide vanes at minimum flow angle, lbm/sec
$C_p$=Constant pressure specific heat of air, BTU/lbm-R
$T_3$=Desired turbine inlet temperature, R
$T_2$=Compressor discharge temperature, R
$\text{LHV}_f$=Lower heating value of the fuel, BTU/lbm By way of example, with standby airflow at 16 pounds per minute, equation (11) yields a motoring fuel flow value of 6 pounds per hour. Beginning with the extrapolated values, adding an estimated 10 horsepower for APU accessory drive loads, assuming a 95% efficient controller 26 and assuming a 95% efficient motor-generator 20 yields a standby motoring load of 47 KW for a hybrid turbogenerator 10.

Equations (7), (8) and (10) indicate that the size of the energy storage device 30 is not a factor that directly affects hybrid operation fuel consumption. The energy storage device 30 size is directly proportional to the duration of the operating mode cycle. The energy storage device 30 need only be large enough to preclude an impracticably fast rate of mode cycles per unit time. For example, if the energy storage device 30 was too small, mode cycling could occur at too high a rate, and as a result might adversely affect durability of system components such as the inlet guide vane actuation mechanism.

The above equations and assumptions can be used to determine the size of the energy storage device 30 required as shown by FIG. 4, given a total elapsed time to complete one cycle equal to one minute. In this regard, FIG. 4 shows that for a one minute cycle time, the size of a capacitor bank that is required peaks at a partial load of 97 KW and a capacitor bank size of 1.3 kilowatt hours. This peak also corresponds to a cycle ratio of 1.0, where a capacitor bank charging interval of 30 seconds equals the capacitor bank discharging interval of 30 seconds. At the rated load of 242 KW, the system does not cycle, the capacitor bank remains fully charged and the generator runs continuously at rated output. At zero system load, the system cycles, but the capacitor bank needs only 11 seconds to charge the capacitor bank, then the APU remains in standby mode for 49 seconds before repeating the cycle.

FIG. 4 can be used to approximate the capacitor bank size. For example, according to FIG. 4, a 1.0 KWH size capacitor bank would have a one minute cycle time at the 25 KW and 170 KW operating points. When operating at system load between 25 KW and 170 KW, cycle time would be less than one minute, and when operating at system load less than 25 KW or greater than 170 KW, the cycle time would be greater than one minute.

FIG. 5 compares the calculated performance of a hybrid turbogenerator 10 (shown as line 62) to a non-hybrid, continuously loaded version of the same type of turbogenerator (shown as line 60). Also shown by line 64 for comparison purposes is a comparably sized non-hybrid APU based on a diesel piston engine driving a generator.

FIG. 5 shows that a diesel based APU would burn less than half the fuel burned by a conventional gas turbine over most of the power range. Fuel burn reduction for the hybrid turbogenerator 10 approaches that of the diesel APU at very low system load, however, the fuel savings benefit of the hybrid turbogenerator diminishes at higher system loads such that the hybrid turbogenerator configuration would generally be most valuable for applications where the power consumption demand primarily favors no load or low load operation.

Referring now to FIG. 6, a hybrid turbogenerator 10 of another embodiment is illustrated. The hybrid turbogenerator 10 of this embodiment alternately operates in the charging mode and the standby mode and includes the elements of the hybrid turbogenerator the embodiment of FIGS. 1 and 2. However, the hybrid turbogenerator 10 of this embodiment also includes a recuperator 34. A recuperator 34 is a heat exchanger that improves turbine engine cycle efficiency by recovering heat from the turbine exhaust gas flow and transferring the heat to the compressor discharge flow prior to delivery of the compressor discharge flow to the combustor 16, thereby requiring less fuel flow within the combustor to heat the charge air to desired turbine inlet temperature. Thus, the recuperator 34 is generally positioned downstream of the turbine 18 so as to receive the turbine exhaust gas flow. Additionally, the recuperator 34 is generally in communication with the compressor discharge flow. Recuperator thermal performance may be defined as:

$$\eta_{rec} = (T_{2.5} - T_2)/(T_4 - T_2) \quad (12)$$

wherein:
$\eta_{rec}$=Recuperator efficiency
$T_2$=Compressor discharge temperature
$T_4$=Turbine discharge temperature
$T_{2.5}$=Burner inlet temperature The effect of pressure drop across the two flow paths of the recuperator 34 may also be accounted for when calculating the effect of the recuperator on power section performance as follows:

$$P_{2.5} = P_2 (1 - dP/P_{2rec}) \quad (13)$$

$$P_4 = P_{4.5} (1 + dP/P_{4.5rec}) \quad (14)$$

wherein:
$P_{2.5}$=Burner inlet pressure, psia
$P_2$=Compressor discharge pressure, psia
$dP/P_{2rec}$=Recuperator cold side pressure drop
$P_4$=Turbine discharge pressure, psia
$P_{4.5}$=Recuperator hot side discharge pressure, psia
$dP/P_{4.5rec}$=Recuperator hot side pressure drop An assessment of APU performance can be obtained by using a model of the gas turbine engine cycle that has been matched to actual APU output performance given by the APU manufacturer's model specification document. For this model, compressor efficiency, turbine efficiency and pressure ratio are held constant, and analysis addresses only the design operating condition at 103° F., sea level ambient. Performance of the baseline gas turbine power section, minus recuperator 34, can be calculated as follows:

For the compressor 14:

$$T_{2s} = T_1 (P_2/P_1)^{(\gamma-1)/\gamma} \quad (15)$$

$$T_2 - T_1 = (T_{2s} - T_1)/\eta_c \quad (16)$$

$$W_c = C_p (T_2 - T_1) \quad (17)$$

$$P_c = W_a W_c \quad (18)$$

wherein:
$T_{2s}$=Air standard compressor discharge temperature, R
$T_1$=Compressor inlet temperature, R
$P_2$=Compressor and diffuser discharge pressure, psia
$P_1$=Compressor inlet pressure, psia
$\gamma$=Specific heat ratio
$T_2$=Compressor discharge temperature, R
$\eta_c$=Compressor and diffuser combined efficiency $W_c$=Compressor work, BTU/lbm
$C_p$=Constant pressure specific heat, BTU/lbm-R
$P_c$=Compressor power, SHP
$W_a$=Air flow rate, lbm/sec
For the combustor (also referenced as a burner) 16:

$$T_3 = T_2 + (W_f \text{LHV}_f)/(C_p W_a) \qquad (19)$$

$$P_3 = P_2(1 - dP/P_2) \qquad (20)$$

wherein:
$T_3$=Turbine inlet temperature, R
$W_f$=Fuel flow, lbm/hour
$\text{LHV}_f$=Lower heating value of fuel, BTU/lbm
$P_3$=Turbine inlet pressure, psia
$dP/P_2$=Burner pressure drop
For the turbine 18:

$$T_{4s} = T_3/(P_3/P_4)^{(\gamma-1)/\gamma} \qquad (21)$$

$$T_4 = T_3 - \eta_t(T_3 - T_{4s}) \qquad (22)$$

$$W_t = C_p(T_3 - T_4) \qquad (23)$$

$$W_{net} = W_t - W_c \qquad (24)$$

$$P = (W_{net} W_a - P_{acc})\eta_g \qquad (25)$$

wherein:
$T_{4s}$=Air standard turbine discharge temperature, R
$\eta_t$=Turbine efficiency
$P_4$=Turbine discharge pressure, psia
$W_t$=Turbine work, BTU/lbm
$T_4$=Turbine discharge temperature, R
$W_{net}$=Net APU work delivered to generator, BTU/lbm
P=Net power delivered by generator, KW
$\eta_g$=Generator efficiency
$P_{acc}$=Accessory drive power, SHP To calculate engine performance without the recuperator 34, equations (15) through (25) can be used. To calculate engine performance with the recuperator 34, the effect of equations (12), (13) and (14) can be added to equations (15) through (25).

FIG. 5 also compares the effect of a recuperator 34 on performance of both a hybrid turbogenerator 10 (as shown by line 68) and a non-hybrid APU (as shown by line 66) relative to the non-recuperator APUs that were discussed above, using fuel burn performance calculated from the analytical engine model.

As shown by line 66, the addition of a recuperator 34 to a non-hybrid APU lowers fuel consumption primarily at high load, while there is little benefit at the low load condition. This is a typical characteristic of gas turbine engines 12 with recuperators 34 because the difference between turbine exit gas temperature and compressor discharge temperature is reduced at part load, which reduces the amount of heat that can be transferred across the recuperator. FIG. 5 also shows that the recuperator 34 reduces rated load APU capacity from 242 KW to 223 KW. This capacity reduction is due to the added pressure drops imposed by the recuperator 34. As such, the gas turbine engine 12 may be scaled up as compared to a comparable gas turbine engine without a recuperator in order to obtain comparable output load performance. FIG. 5 also shows (as shown by line 68) that adding a recuperator 34 to a hybrid turbogenerator 10 provides a consistent fuel flow reduction across the full load range as compared to a non-hybrid APU.

Referring now to FIG. 7, a hybrid turbogenerator 10 in accordance with another embodiment is illustrated. The hybrid turbogenerator 10 of this embodiment includes a plurality of valves 36, such as a multiple stage selector valve, to change the gas flow path between components of the gas turbine engine 12. As described above in conjunction with the embodiments of FIGS. 1, 2 and 6, the hybrid turbogenerator 10 includes a gas turbine engine 12 including a compressor 14, a combustor 16 and a turbine 18. The hybrid turbogenerator 10 may also include a recuperator 34. Further, the hybrid turbogenerator 10 may include a motor-generator 20 rotatably connected to the gas turbine engine 12 and a controller 26 for controlling energy flow between the motor-generator and energy storage device 30, such as a capacitor bank, and a power bus 28. Further, the hybrid turbogenerator 10 may include a bleed valve 32 for controlling the redirection of bleed air from the compressor discharge.

Although the hybrid turbogenerator 10 may include any number of valves 36, the hybrid turbogenerator 10 of the illustrated embodiment includes three selector valves commonly driven by a single actuator 37 which may, for example, be operated under direction by the controller 26. Although the selector valves 36 may be configured in various manners, each selector valve of one embodiment may include a plate mounted at 45° on an actuation shaft and contained within a spherical housing. The actuator 37 of this embodiment may be a rotary actuator configured to stroke the actuator shaft through 180° of rotation to select from one operating mode or the other. In this embodiment, a metallic piston ring-type seal may be incorporated on the periphery of the plate to minimize internal gas leakage.

In the charging mode, the valves 36 may be set as shown in FIG. 7. In the charging mode of operation, air may enter through the inlet 38 and may be directed to the compressor 14. The compressed air discharged by the compressor 14 may then be directed through the recuperator 34 to the combustor 16 and, in turn, to the turbine 12 for discharge through the exhaust 24. As shown in FIG. 7, the motor-generator 20 is rotatably connected to the air turbine engine 12 such that the motor-generator in the charging mode provides energy to the controller 26 which, in turn, distributes the energy to the power bus 28 and to the energy storage device 30 for recharging the energy storage device. Thereafter, as shown in FIG. 8, in the standby mode, the actuator 37, such as in response to direction by the controller 26 following the determination by the controller that the energy storage device 30 has stored a sufficient charge, such as by being fully charged, may cause the plurality of valves 36 to move to a different position so as to redirect the air flow through the hybrid turbogenerator 10. In this embodiment, air is received through the inlet 38 and initially passes through the recuperator 34 such that the air is preheated. Thereafter, the air enters the combustor 16 at ambient pressure with the air being further heated as a result of the combustion and the combustion gas is then expanded through the turbine 18, such as to less than 3 psia. The turbine discharge gas cools as it passes through the recuperator 34 and then is directed to the compressor 14 for being compressed back to ambient pressure prior to being expelled through exhaust 24. Since the compressor 14 and the turbine 18 operate on relatively low density gas, the mass flow of air through the gas turbine engine 12 is substantially reduced, thereby minimizing the fuel flow required to maintain operation at governed speed and zero or substantially reduced generator load. Thus, while the energy storage device 30 may provide energy to the motor-generator 20 to sustain operation of the gas turbine engine during the standby mode as described in the prior embodiment, this may not be necessary and, instead, the controller 26 may direct the energy storage device to provide energy to the power bus 28 exclusively for distribution to one or more loads as shown in FIG. 8.

Referring now to FIG. 9, a method of operating a hybrid turbogenerator 10 of the embodiment shown in FIGS. 7 and 8 is depicted. As shown, the charge stored by the energy storage device 30 may be monitored, such as by the controller 26, and, based upon the charge stored by the energy storage device, a mode of operation may be determined. See blocks 70 and 72. For example, in an instance in which the energy storage device 30 stores a charge that satisfies a predefined threshold, such as by being fully charged, the hybrid turbogenerator 10 may be operated in a standby mode. Conversely, in an instance in which the energy storage device 30 has less than a predefined charge, such as by being fully depleted, the hybrid turbogenerator 10 may be placed in a charging mode of operation. In the standby mode of operation, the hybrid turbogenerator 10 may be operated so as to controllably position a plurality of valves 36 to direct the air flow to the turbine 18 and then to the compressor 14. See block 74. In the standby mode, electric power is provided by the controller 26 to the power bus 28 from the energy storage device 30. See block 76. However, in the charging mode, the hybrid turbogenerator 10 may be operated so as to controllably position a plurality of valves to redirect airflow to the compressor 14 and then to the turbine 18. See block 78. In the charging mode, electric power is provided from the electric motor-generator 20 to the power bus 28 and the energy storage device 30, thereby recharging the energy storage device. See block 80.

Referring now to FIGS. 10 and 11, a hybrid turbogenerator 10 in accordance with another embodiment of the present disclosure illustrated. The hybrid turbogenerator 10 includes a number of the same components described above in conjunction with the other embodiments. However, the hybrid turbogenerator of this embodiment also includes an intercooler 39 configured, during operation in the standby mode, to cool gas flowing between the turbine 18 and the compressor 14. In this regard, FIG. 10 illustrates the hybrid turbogenerator in a charging mode. In the charging mode, the turbine discharge passes through a recuperator 34 and is directed by valve 36 to the exhaust 24 without interaction with the intercooler 39. Conversely, in the standby mode, as shown in FIG. 11, the intercooler 39 is active such that the turbine discharge passes through the recuperator 34 and is directed by valve 36 to the intercooler. The intercooler 39 serves to cool the gas prior to providing the gas to the compressor 14.

A hybrid turbogenerator 10 that includes an intercooler 39 may be less expensive and lighter by permitting a lower efficiency recuperator 34 (and, consequently, a less expensive and lighter weight recuperator) to be employed. In this regard, a typical gas turbine recuperator may be constructed of a welded nickel alloy core, such as Inconel, in order to withstand the peak exhaust gas temperatures. A welded nickel alloy core may be somewhat expensive and heavy. In accordance with an embodiment of the present disclosure, however, a recuperator 34 that has a reduced capacity and, as a result, is less expensive and lighter in weight may sufficiently reduce the exhaust gas temperature to enable use of a downstream intercooler having a less expensive and lighter brazed aluminum core. In one embodiment, for example, an aluminum intercooler core may be integrated with an oil cooler core to reduce overall cost impact.

Referring to FIG. 12 by way of example but not of limitation, the fuel burn performance of a hybrid turbogenerator 10 of one embodiment that includes a plurality of valves 36 for controlling the air flow through the air turbine engine 12 is shown by line 70 relative to the fuel flow performance of a hybrid turbogenerator of the type shown in FIG. 6 that includes one or more inlet guide vanes 22 and a recuperator 34 as shown by line 68. For point of reference, the fuel flow performance of a non-hybrid APU and a non-hybrid diesel APU are shown by lines 60 and 64, respectively, as described above. As illustrated, the fuel burn performance of a hybrid turbogenerator 10 that includes a plurality of valves 36 as shown, for example, in the embodiments of FIGS. 7 and 8 may improve upon the fuel flow performance at low system loads since the fuel flow to the combustor 16 is greater for the hybrid turbogenerator having a plurality of valves 36 in the standby mode as compared to the hybrid turbogenerator having one or more inlet guide vanes 22 as shown in FIG. 6. Nevertheless, the elimination of motoring drag for the hybrid turbogenerator 10 having a plurality of valves 36 for controlling the air flow through the air turbine engine 12 benefits overall fuel efficiency to a greater degree while operating at low system load demands.

By way of another example, FIG. 13 illustrates the fuel burn performance of various turbogenerators including a conventional turbogenerator as shown by line 60, a hybrid turbogenerator 10 having one or more inlet guide vanes 22 as shown by line 62, a non-hybrid diesel turbogenerator as shown by line 64, a non-hybrid turbogenerator having a recuperator as shown by line 66, a hybrid turbogenerator having one or more inlet guide vanes and a recuperator 34 as shown by line 68, a hybrid turbogenerator having a plurality of selector valves 36 as shown by line 70 and a hybrid diesel turbogenerator as shown by line 72. In regards to the hybrid diesel turbogenerator, the diesel reciprocating piston engine may shut down while in standby mode and provide advantageous fuel burn performance, but generally at the cost of increased weight.

In order to determine the amount of fuel that will be burned by a hybrid turbogenerator 10 such as embodied by an APU, the duty cycle, or elapsed time, during each load condition that the hybrid turbogenerator operates over an extended time period may be determined. Fuel burned over each time segment may then be summed and integrated to determine the duty cycle (block) fuel burn rate. In this regard, FIG. 14 illustrates a block fuel consumption comparison for the various hybrid turbogenerator configurations for purposes of example but not of limitation. For configurations having a recuperator 34, the previously calculated fuel burn rates may be scaled relative to FIG. 12 to normalize them with respect to the standard rated performance output of 242 KW. In FIG. 14, duty cycle loading profiles are defined based on arbitrary assumptions that the hybrid turbogenerator operates 5% of the time at full load, operates 5% of the time at zero load and operates the remaining percentage of time distributed evenly at 25%, 50% and 75% loads. Assuming a different loading profile will yield different quantitative block fuel burn results. Setting aside the diesel turbogenerators (standard diesel turbogenerator 64 and hybrid diesel turbogenerator 72) that may be relatively heavy, the hybrid turbogenerators 10 of the various embodiments of the present disclosure including a hybrid turbogenerator having at least one inlet guide vane 22 (see line 62), a hybrid turbogenerator having at least one inlet guide vane and a recuperator 34 (see line 68) and a hybrid turbogenerator having a plurality of selector valves 36 (see line 70) have advantageous fuel burn characteristics relative to the standard gas turbogenerator (see line 76) and, to some degree, relative to a gas turbine having only a recuperator (see line 74).

In particular, considering the standard gas turbine block fuel consumption at 204 pounds per hour (PPH) shown as line 76 in FIG. 14 as a baseline, the hybrid turbogenerator 10 that includes one or more guide vanes 22 yields a block fuel burn reduction of 16%. Adding a recuperator to the standard gas turbine (see line 74) may yield a 21% reduction from the baseline, while adding a recuperator 34 to the hybrid turbogenerator 10 having one or more of the guide vanes 22 (see line 68) may yield a 41% reduction from the baseline. Thus, adding a recuperator 34 proportionately benefits the hybrid turbogenerator 10 to a greater degree as compared to adding a recuperator to a non-hybrid gas turbine. In this regard, by adding a recuperator 34 to a hybrid turbogenerator 10 having at least one guide vane 10 improves fuel burn performance by 30%, while adding a recuperator to the baseline design improves fuel burned by 21%.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method of operating a hybrid turbogenerator including a gas turbine engine coupled to an electric motor-generator, the method comprising:
    alternating between a standby mode and a charging mode, wherein during operation in the standby mode, the method further comprises:
    at least partially closing one or more inlet guide vanes to limit air flow through a compressor and to a turbine of the gas turbine engine; and
    providing electric power to both a power bus and the electric motor-generator from an energy storage device; and
    wherein during operation in the charging mode, the method further comprises:
    at least partially opening the one or more inlet guide vanes to increase air flow through the compressor and to the turbine of the gas turbine engine relative to the standby mode; and
    providing electric power from the electric motor-generator to both the power bus and the energy storage device.

2. A method according to claim 1 further comprising recovering heat from an exhaust gas flow from the gas turbine engine and transferring the heat to a discharge flow from the compressor.

3. A method according to claim 1 wherein alternating between the standby mode and the charging mode comprises monitoring a charge stored by the energy storage device and controlling operation in the standby mode and the charging mode based upon the charge stored by the energy storage device.

4. A method according to claim 1 wherein at least partially closing the one or more inlet guide vanes during the standby mode comprises closing the one or more inlet guide vanes so as to limit air flow therethrough to less than a predefined percentage of the air flow through the one or more inlet guide vanes during the charging mode.

5. A method according to claim 1 further comprising providing an intermittent supply of bleed air from the compressor with more bleed air supplied during the charging mode than during the standby mode.

6. A hybrid turbogenerator comprising:
    a gas turbine engine comprising a compressor, a combustor and a turbine;
    an electric motor-generator rotationally coupled to the gas turbine engine;
    an energy storage device;
    one or more inlet guide vanes positioned to at least partially control air flow through the compressor and to the turbine of the gas turbine engine; and
    a controller configured to cause operation of the hybrid turbogenerator to alternate between a standby mode and a charging mode,
    wherein, during operation in the standby mode, the controller is configured to:
    at least partially close one or more inlet guide vanes to limit air flow through the compressor and to the turbine of the gas turbine engine; and
    provide electric power to both a power bus and the electric motor-generator from the energy storage device; and
    wherein, during operation in the charging mode, the controller is configured to:
    at least partially open the one or more inlet guide vanes to increase air flow through the compressor and to the turbine of the gas turbine engine relative to the standby mode; and
    provide electric power from the electric motor-generator to both the power bus and the energy storage device.

7. A hybrid turbogenerator according to claim 6 further comprising a recuperator configured to recover heat from an exhaust gas flow from the gas turbine engine and to transfer the heat to a discharge flow from the compressor.

8. A hybrid turbogenerator according to claim 6 wherein the controller is further configured to monitor a charge stored by the energy storage device and to control operation in the standby mode and the charging mode based upon the charge stored by the energy storage device.

9. A hybrid turbogenerator according to claim 6 wherein the energy storage device comprises a capacitor bank.

10. A hybrid turbogenerator according to claim 6 wherein the controller is configured to at least partially close the one or more inlet guide vanes during the standby mode so as to limit air flow therethrough to less than a predefined percentage of the air flow through the one or more inlet guide vanes during the charging mode.

11. A method of operating a hybrid turbogenerator including a gas turbine engine coupled to an electric motor-generator, the method comprising:
    alternating between a standby mode and a charging mode, wherein during operation in the standby mode, the method further comprises:
    controllably positioning a plurality of valves so as to direct air flow through a turbine and then to a compressor of the gas turbine engine; and
    providing electric power to a power bus from an energy storage device; and
    wherein during operation in the charging mode, the method further comprises:
    controllably positioning the plurality of valves so as to redirect air flow to the compressor and then to the turbine of the gas turbine engine; and
    providing electric power from the electric motor-generator to both the power bus and the energy storage device.

12. A method according to claim 11 wherein during operation in the standby mode the method further comprises intercooling gas flowing between the turbine and the compressor.

13. A method according to claim 11 wherein during operation in the charging mode the method further comprises recovering heat from an exhaust gas flow from the gas turbine engine and transferring the heat to a discharge flow from the compressor.

14. A method according to claim 11 wherein controllably positioning the plurality of valves during operation in the standby mode comprises controllably positioning the plurality of valves so as to direct air flow through a recuperator for preheating to a burner for combustion to the turbine for expansion and then to the compressor for compression prior to being exhausted.

15. A method according to claim 11 wherein alternating between the standby mode and the charging mode comprises monitoring a charge stored by the energy storage device and controlling operation in the standby mode and the charging mode based upon the charge stored by the energy storage device.

16. A hybrid turbogenerator comprising:
a gas turbine engine comprising a compressor and a turbine;
an electric motor-generator rotationally coupled to the gas turbine engine;
an energy storage device;
a plurality of valves configured to direct air flow through the gas turbine engine; and
a controller configured to cause operation of the hybrid turbogenerator to alternate between a standby mode and a charging mode,
wherein, during operation in the standby mode, the controller is configured to:
controllably position the plurality of valves so as to direct air flow through the turbine and then to the compressor of the gas turbine engine; and
provide electric power to a power bus from the energy storage device; and
wherein, during operation in the charging mode, the controller is configured to:
controllably position the plurality of valves so as to redirect air flow to the compressor and then to the turbine of the gas turbine engine; and
provide electric power from the electric motor-generator to both the power bus and the energy storage device.

17. A hybrid turbogenerator according to claim 16 further comprising an intercooler configured, during operation in the standby mode, to cool gas flowing between the turbine and the compressor.

18. A hybrid turbogenerator according to claim 16 further comprising a recuperator configured, during operation in the charging mode, to recover heat from an exhaust gas flow from the gas turbine engine and to transfer the heat to a discharge flow from the compressor.

19. A hybrid turbogenerator according to claim 16 wherein the controller, during operation in the standby mode, is further configured to controllably position the plurality of valves so as to direct air flow through a recuperator for preheating to a burner for combustion to the turbine for expansion and then to the compressor for compression prior to being exhausted.

20. A hybrid turbogenerator according to claim 16 wherein the controller is further configured to monitor a charge stored by the energy storage device and to control operation in the standby mode and the charging mode based upon the charge stored by the energy storage device.

* * * * *